June 20, 1961     R. ZDANOWSKI     2,989,420

COATED ARTICLES

Filed Nov. 13, 1958

WEAR LAYER OF GRAFT COPOLYMER OF A
SYNTHETIC RUBBER POLYMER WITH:

A. METHYL METHACRYLATE
B. METHYL METHACRYLATE AND STYRENE
C. METHYL METHACRYLATE AND VINYLTOLUENE
D. METHYL METHACRYLATE AND ISOBORNYL METHACRYLATE

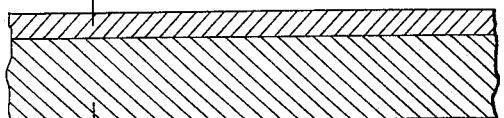

FLOORING MATERIAL, SINGLE LAYER OR
MULTI-LAYER, E.G., OF WOOD, TILE,
LINOLEUM, AND SO ON.

INVENTOR
RICHARD ZDANOWSKI

BY *Carl A. Costellan*

ATTORNEY

2,989,420
COATED ARTICLES

Richard Zdanowski, Philadelphia, Pa., assignor to Rohm & Haas Company, Philadelphia, Pa., a corporation of Delaware
Filed Nov. 13, 1958, Ser. No. 773,578
11 Claims. (Cl. 117—76)

This invention concerns coated floors or floor coverings, and it is particularly concerned with the preparation of flexible, tough, stain-resistant, abrasion-resistant, water-resistant, and alkali-resistant coatings on flooring materials.

A primary object of the present invention is to provide wear-resistant coatings of modified synthetic rubber latices on various substrates which are capable of serving as floors or floor-coverings, especially those of the felt-base and linoleum type. Another object of the present invention is to provide for coating such substrates with aqueous dispersions of grafted synthetic rubber copolymers which are adapted to be applied at room temperature and are capable of producing wear-resistant coatings which are sufficiently flexible and tough to permit the coated substrates to be flexed so that they can be rolled upon themselves. Other objects and advantages will be apparent from the description hereinafter.

Felt-base is normally prepared by printing a decorative wearing surface upon a suitably treated carrier backing. Generally speaking, the backing is formed of an asphalt-saturated felt carrying one or more seal-coats which serve to render the surface of the backing sufficiently smooth to receive the comparatively thin film of paint which forms the decorative wearing surface of the floor covering. While felt-base material is less expensive than most other floor-covering of its type, its wearing qualities are poor due to relatively small thickness of the decorative wearing surface. It is the purpose of my invention to up-grade the wearing qualities of such a floor covering by providing a clear, tough, stain-resistant wear layer over the decorative surface.

In spite of the additional cost incurred by the use of my invention, it still permits the classification of such a modified felt-base material as a relatively inexpensive floor covering.

Linoleum is manufactured by depositing a mixture of filler, pigment, and linoleum binder, generally obtained by oxidizing a drying oil in the presence of a resin, upon a suitable carrier backing, for example saturated felt. The mass is then stored or cured for a considerable period of time to obtain the desired properties of resilience and flexibility in the wearing surface. Linoleum is a comparatively expensive flooring material because of the raw materials from which it is manufactured and further because of the techniques employed. Its wearing properties are considerably better than are attainable with the above-described felt base. With the use of my invention its general appearance as well as wearing properties are considerably improved.

The single figure of the drawing is a diagrammatic view in cross-section illustrating the present invention.

In accordance with the present invention, it has been found that outstanding coating compositions adapted to produce tough, flexible, stain-resistant, and wear-resistant coatings on various substrates including asphalt tile, felt base, and linoleum can be produced by grafting a monomeric material selected from (a) methyl methacrylate, (b) a mixture of methyl methacrylate with styrene, (c) a mixture of methyl methacrylate and vinyltoluene, and (d) a mixture of methyl methacrylate with isobornyl methacrylate on the polymer existing in a synthetic rubber latex obtained by the emulsion polymerization of 50 to 100% by weight of a diolefin, such as isoprene, chloroprene, or butadiene (preferred range 65 to 100%), with 0 to 50% by weight of styrene or vinyltoluene (preferred range 0 to 35%). Typical commercially-available synthetic latices are described by Cook in "Latex—Natural and Synthetic," Reinhold Publishing Company (1956). Preferably, the grafting is carried out on copolymers of butadiene with styrene. The vinyltoluene may be any of the ortho, meta, or para isomers or any mixture thereof.

The proportion of the monomeric material should be from about 50 to 90% by weight, and preferably 60 to 85% by weight, based on the entire weight of the final grafted copolymer in the aqueous dispersion or latex obtained. The proportion of styrene, vinyltoluene, or isobornyl methacrylate in the monomeric mixtures may be as high as 150% of the weight of methyl methacrylate.

In general, the preparation of the graft copolymer is obtained by introducing into the latex of synthetic rubber a solution of a polymerization initiator in the monomeric material such that the amount of initiator introduced with this monomeric material, whether this monomeric material is added in a single step or by a series of aliquot portions, is from about 0.1% to 1% of the total weight of polymer and monomers in the system. After stirring in the monomer and initiator over a period of time to assure that the monomer is absorbed by the particles of polymer in the latex such as from 1 to 4 hours, a polymerization activator may be added. After the addition of the activator which is thoroughly mixed into the system by stirring, the batch is held at the desired temperature preferably about 20° to 90° C. until polymerization is completed such as from one hour to several hours. Instead of adding all of the initiator with the monomers and the entire amount of activator in a single step, a portion only of the initiator may be put into the monomer mixture; and after the absorption of the monomer mixture on the latex particles, only a portion of the activator may be added in which event additional portions of the initiator and activator may be added periodically during the final polymerization period.

As initiators any free-radical initiator may be used of which the peroxygen compounds are representative. Organic peroxides and hydroperoxides as well as hydrogen peroxide and inorganic persulfates are useful. Examples include benzoyl peroxide, cumene hydroperoxide, t-butyl hydroperoxide, phenylcyclohexane hydroperoxide, and ammonium or potassium persulfate.

Various activators may be employed such as the polyalkyleneamines generally including ethylenediamine, diethylenetriamine, triethylenetetramine, and tetraethylenepentamine. When no ammonia is present, sodium-formaldehyde sulfoxylate may be employed as an activator. The alkali metal hydrosulfites and metal bisulfites may also be employed as activators.

The proportion of activator may be comparable to that of the initiator such as from about 0.1% to 1% by weight of the total of the polymer and monomer weights. Besides employing activators, promoters such as traces of copper, silver, or iron ions may be employed.

Best results are obtained when the amount of excess surface-active agent over that required to confer adequate stability to the latex is kept at a minimum and when short-stops, anti-oxidants, and other additives are not of such a nature or present in sufficiently large quantities so as to inhibit or seriously retard the polymerization or grafting of the mixture of methyl methacrylate and isobornyl methacrylate.

The aqueous dispersion of the graft copolymer may be applied at a concentration from about 1 to 65% or more. Preferably, however, it is diluted to a concentration of about 40 to 55% by weight of copolymer on the weight of the entire dispersion. Such dilution, of course, is preferably accomplished by the addition of water. During the coating operation, the composition may be applied at a temperature from room temperature up to 100° C. depending upon the minimum film-forming temperature of the dispersion. In some cases the character of the substrate or prevalent manufacturing conditions do not allow the use of elevated temperatures for fluxing and drying of the coatings. In such event it may be desirable to incorporate into the dispersion a plasticizer which could be of either permanent nature, i.e., remaining in the film after coalescence, or of the fugitive type commonly called a fluxing-aid or a coalescing-aid which would leave the film once film continuity has been achieved. The latter type may be preferred since, due to the relatively high volatility of the modifiers, the final film hardness of the graft copolymer would not be lowered. The amount of plasticizer of either type may be as high as 70% by weight of the copolymer weight, with the exact quantity depending on the minimum film-formation temperature of the unplasticized graft, and the ambient temperature available for film deposition.

The so-called permanent plasticizers may include various high boiling esters of phthalic acid such as dimethyl phthalate, dibutyl phthalate, butylbenzyl phthalate, etc., esters of sebacic acid such as dioctyl sebacate and many other substances which will function as plasticizers for the graft particles in the dispersion to facilitate their deformation during the process of film formation leading to the attainment of film continuity.

The fugitive plasticizers, usually called fluxing or coalescing aids, normally consist of solvents or relatively low-boiling plasticizers for the graft copolymer. The boiling points of these compositions (at 760 mm. Hg) fall within a range of 150° C. to 250° C. and preferably in the range of 170° to 215° C. Examples of the fluxing aids (and their boiling points) are 2-ethoxyethyl acetate (156° C.), 2-butoxyethyl acetate (191° C.), diethyleneglycol monoethylether (201.9° C.), diethyleneglycol (mono)-methyl ether (193° C.), 2-(2-butoxyethoxy)-ethyl acetate (246° C.), isophorone (215° C.), benzyl alcohol (205° C.).

The coating compositions of the present invention may be applied to all sorts of substrates and are especially valuable for the coating of floor coverings and wall coverings of felt-base and linoleum types. Besides the latter, the compositions may be applied to linoleum, wood, asphalt tile, rubber tile, vinyl resin tile, leather, and metal surfaces. They are useful also as the top-coating layers over any of these substrates on which pigmented base-coats have been applied and which it is desired to protect against abrasion and scuffing. For example, on wooden floors, they may be employed as a substitute for varnish or as the top wear-layer over one or more preliminary coats of varnish. In the case of linoleum, felt-base coverings, and the various plastic tile compositions mentioned above, pigmented coatings may be applied prior to the graft copolymer or the graft copolymer may be applied directly to the composition of the tile in which event it may be desirable to include a pigment or dye. Of course, in any case, a single coat of the graft copolymer dispersion or a series of such coats may be applied and one or more of such coats may be pigmented if desired. The thickness of the coating may vary from about ½ mil to 20 mils or more.

In the single figure of the drawing the upper layer shown is greatly exaggerated in thickness since this wear layer of the graft copolymer used in accordance with the present invention may be extremely thin. It may be the result of one or more applications of coating compositions containing a graft copolymer. Similarly, the substrate is shown only in diagrammatic fashion and it may be of greater or less thickness than that shown. It may be a single layer of homogeneous material or it may be a composite, multi-layered material including as typically representative thereof a felt-base material including seal-coats and decorative layers which may be applied by coating procedures.

In the following examples which are illustrative of the invention, the parts and percentages are by weight unless otherwise indicated.

*Example 1*

(a) GRS 2105 synthetic rubber latex (320 parts of 61.5% solids cold-process copolymer of 70% butadiene and 30% styrene) was introduced into a reaction vessel. 485 parts by weight of water containing 2.5 parts by weight of sodium lauryl sulfate was added followed by a mixture of 100 parts by weight of methyl methacrylate and 100 parts by weight of isobornyl methacrylate containing 0.4 part by weight of cumene hydroperoxide. The mixture was stirred for two hours and 2.2 parts by weight of 10% aqueous soluton of sodium formaldehyde sulfoxylate was added. The composition was stirred for one hour while the temperature was maintained at 60° C. At the end of the reaction, 4.0 parts by weight of 2,6-di-tertiary-butyl-4-methylphenol was incorporated into the dispersion for the purpose of functioning as an anti-oxidant.

(b) A mixture of 20 parts by weight of butoxyethyl acetate, 40 parts by weight of water, and 0.6 part of t-octylphenoxypolyethoxyethanol containing about 10 oxyethylene units was prepared and introduced into 100 parts by weight of the graft copolymer dispersion obtained in the preceding paragraph.

(c) The composition obtained in part (b) was then applied as a top-coating to a section of a felt-base material consisting of an asphalt-saturated felt-base carrying three pigmented base coats upon which there was superimposed a decorative design. The coated assembly was then dried in a circulating oven at 95° C. for a period of six hours. The amount of dispersion used produced a dried film thickness of 0.003 inch. The surface with the coating upon it was characterized by a high degree of gloss, excellent resistance to marring, and the finished floor covering could be rolled upon itself without showing any signs of crazing. The clear wear layer thus deposited was found to be completely resistant to stains by tincture of iodine, tincture of merthiolate, lipstick, and animal and vegetable fats. It showed no whitening upon prolonged exposure to water or mild alkali (3% $NH_4OH$). Actual floor tests under foot-traffic conditions showed the coating to have a superior resistance to wear, marring, dirt pick-up, and scuffing in comparison to commercial felt-base asphalt and linoleum floor coverings.

*Example 2*

(a) Three-hundred and thirty parts of GRS 2003 (hot process 70% butadiene and 30% styrene) synthetic rubber latex (60.5% solids) was mixed with 2.5 parts of sodium lauryl sulfate and 475 parts of deionized water. A solution of 0.5 part of cumene hydroperoxide in a mixture of 100 parts of methyl methacrylate and 100 parts of isobornyl methacrylate was added and the mixture was stirred for one hour. The mixture was heated to 70° C. and 5 parts of a 0.1% aqueous solution of ferrous sulfate was added along with 10 parts of 10% sodium formaldehyde sulfoxylate. After approximately ten minutes, an exothermic polymerization reaction began and cooling was necessary to maintain the temperature between 65° and 70° C. The mixture was allowed to stir for sixteen hours, an additional 0.5 part of cumene hydroperoxide was added and the temperature was raised to 68° C. Five parts of 10% sodium formaldehyde sulfoxylate was added. There was no further exothermic reaction. The mixture was cooled to room temperature. Then 2% based on GRS solids of 2,6-di-tertiary-butyl-4-methylphenol was incorporated into the dispersion to function as an anti-oxidant.

(b) A mixture of 16 parts by weight of 2-ethoxyethyl acetate, 40 parts by weight of water, and 0.6 part of t-octylphenoxypolyethoxyethanol containing about 10 oxyethylene units was prepared and introduced into 100 parts by weight of the graft copolymer dispersion obtained in the preceding paragraph.

(c) The composition obtained in part (b) was applied to a felt-base floor-covering as in Example 1(c) with similar results.

*Example 3*

(a) 590 parts by weight of water containing two parts by weight of sodium lauryl sulfate were added with stirring to 167 parts by weight of GRS 2003 (a 60.5% solids hot-process latex of 70% butadiene and 30% styrene). To this mixture a blend of 200 parts by weight of methyl methacrylate and 100 parts by weight of styrene which contained 0.8 part by weight of cumene hydroperoxide were added slowly with stirring. After one hour of agitation, 8 parts by weight of 10% aqueous solution of sodium formaldehyde sulfoxylate were added followed by an addition of 10 parts by weight of 0.1% aqueous solution of ferrous sulfate. The mixture was heated to 50° C. and stirred for one hour. Two parts by weight of 2,6-di-tertiary-butyl-4-methylphenol was added to the graft for the purpose of functioning as an antioxidant.

(b) A mixture of 30 parts by weight of diethyleneglycol monoethyl ether, 40 parts by weight of water, and 0.6 part of t-octylphenoxypolyethoxyethanol containing about 10 oxyethylene units was prepared and introduced into 100 parts by weight of the graft copolymer dispersion obtained in the preceding paragraph.

(c) The composition obtained in part (b) was applied to a felt-base floor-covering as in Example 1(c) with similar results.

*Example 4*

(a) 330 parts of GRS 2104 (cold process 100% butadiene) synthetic rubber latex (60% solids) was mixed with 2.5 parts of sodium lauryl sulfate and 2600 parts by weight of de-ionized water. A solution of 4.5 parts of cumene hydroperoxide in 1800 parts by weight of methyl methacrylate was added and the resulting mixture was stirred one hour. The mixture was heated to 70° C. and 45 parts of a 0.1% aqueous solution of ferrous sulfate was added along with 90 parts of 10% sodium formaldehyde sulfoxylate. After approximately 10 minutes, an exothermic polymerization reaction began and cooling was necessary to maintain the temperature between 65° and 70° C. The mixture was allowed to stir for 16 hours at this temperature after which an additional 0.5 part of cumene hydroperoxide was added along with 5 parts of 10% sodium formaldehyde sulfoxylate solution. The mixture was then cooled to room temperature and 2%, based on the weight of copolymer, of 2,6-di-t-butyl-4-methylphenol was incorporated into the dispersion.

(b) The procedure of Example 1(b) was repeated replacing the graft copolymer dispersion with that obtained in part (a) hereof.

(c) The composition obtained in part (b) was applied as a top-coating or wear-coating to linoleum. On drying in a circulating oven at 95° C. for about six hours, the coating thickness obtained was 0.005". The coating was characterized by high gloss and excellent resistance to marring. The linoleum could be rolled upon itself without any signs of crazing in this wear coating. The clear wear layer was completely resistant to staining by tincture of iodine, tincture of merthiolate, lipstick, and animal and vegetable fats. It showed no whitening upon prolonged exposure to water or 3% ammonium hydroxide. Foot-traffic wearing tests proved the coating to have outstanding resistance to wear, marring, and dirt pick-up as compared to conventional linoleum products.

*Example 5*

An aqueous dispersion of a graft copolymer of about 25% by weight of vinyltoluene, 50% by weight of methyl methacrylate, and 25% by weight of GRS 2003 was prepared as in Example 2(a) substituting the appropriate proportions of the two monomers and of the GRS latex. The procedure of Example 1(b) is repeated substituting the graft copolymer dispersion thus obtained. The coating compositions resulting were then applied to felt-base flooring materials, linoleum, and asphalt tile with results similar to those obtained in Example 1(c).

*Example 6*

An aqueous dispersion of a graft copolymer of 75% by weight of methyl methacrylate and 25% by weight of GRS latex 2003 was obtained by the procedure of Example 2(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 7*

An aqueous dispersion of a graft copolymer of 60% by weight of methyl methacrylate and 40% by weight of GRS latex 2003 was obtained by the procedure of Example 2(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 8*

An aqueous dispersion of a graft copolymer of 30% of isobornyl methacrylate, 30% of methyl methacrylate, and 40% of GRS latex 2003 was produced by the procedure of Example 2(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 9*

An aqueous dispersion of a graft copolymer of 30% of styrene, 30% of methyl methacrylate, and 40% of GRS latex 2003 was produced by the procedure of Example 2(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 10*

An aqueous dispersion of a graft copolymer of 30% of isobornyl methacrylate with 30% of methyl methacrylate, and 40% of GRS latex 2105 was prepared as in Example 1(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 11*

An aqueous dispersion of a graft copolymer of 30% of styrene with 30% of methyl methacrylate, and 40% of GRS latex 2105 was prepared as in Example 1(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

*Example 12*

An aqueous dispersion of a graft copolymer of 40% of isobornyl methacrylate with 20% of methyl methacrylate, and 40% of GRS latex 2105 was prepared as in Example 1(a). The process of Example 1(b) was repeated substituting the graft copolymer obtained herein. Linoleum felt-base floor-coverings, vinyl tile, asphalt tile, and wood flooring were coated with the resulting composition. The properties of the coating were similar to those obtained in Example 1.

*Example 13*

An aqueous dispersion of a graft copolymer of 25% isobornyl methacrylate, 50% of methyl methacrylate, and 25% of GRS latex 2104 is prepared by the procedure of Example 4(a). The process of Example 1(b) was repeated substituting the graft copolymer obtained herein. Linoleum, felt-base floor-coverings, vinyl tile, asphalt tile, and wood flooring were coated with the resulting composition. The properties of the coating were similar to those obtained in Example 1.

It is to be understood that changes and variations may be made without departing from the spirit and scope of the invention as defined by the appended claims.

I claim:

1. As an article of manufacture, a flooring material carrying a wear-resistant coating thereon comprising a water-insoluble graft copolymer of a monomeric material selected from the group consisting of (a) methyl methacrylate, (b) a mixture of methyl methacrylate and styrene, (c) a mixture of methyl methacrylate and vinyltoluene, and (d) a mixture of methyl methacrylate and isobornyl methacrylate obtained by polymerizing the monomeric material in an aqueous dispersion of a synthetic rubber polymer of 50 to 100% by weight of a conjugated diolefin and up to 50% by weight of a member selected from the group consisting of styrene and methyl styrenes, the proportion of the monomeric material being from about 50 to 90% by weight of the entire weight of the resultant copolymer.

2. As an article of manufacture, a flooring material carrying a wear-resistant coating thereon comprising a water-insoluble graft copolymer of a monomeric material selected from the group consisting of (a) methyl methacrylate, (b) a mixture of methyl methacrylate and styrene, and (c) a mixture of methyl methacrylate and vinyltoluene, and (d) a mixture of methyl methacrylate and isobornyl methacrylate obtained by polymerizing the monomeric material in an aqueous dispersion of a synthetic rubber polymer of 65 to 100% by weight of butadiene with up to 35% by weight of styrene, the proportion of the monomeric material being from about 50 to 90% by weight of the entire weight of the resultant copolymer.

3. As an article of manufacture, a flooring material carrying a coating thereon comprising a graft copolymer of a monomeric mixture of methyl methacrylate and isobornyl methacrylate in which the proportion of the latter is up to 150% by weight of the former obtained by polymerizing the monomeric mixture in an aqeuous dispersion of a polymer of 50 to 100% of a conjugated diolefin with up to 50% of a member selected from the group consisting of styrene and vinyltoluene, the proportion of the mixture of methacrylates being about 50 to 90% by weight of the methacrylate-diolefin-styrene graft copolymer obtained.

4. As an article of manufacture, a linoleum carrying on the wear surface thereof a coating comprising a graft copolymer of a mixture of methyl methacrylate and isobornyl methacrylate in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the mixture of methacrylates being about 50 to 90% by weight of the methacrylate-butadiene-styrene graft copolymer obtained.

5. As an article of manufacture, a linoleum carrying on the wear surface thereof a coating comprising a graft copolymer of methyl methacrylate obtained by polymerizing methyl methacrylate in an aqueous dispersion of a polymer of 50 to 100% by weight of a conjugated diolefin with up to 50% by weight of a member selected from the group consisting of styrene and vinyltoluene, the proportion of methacrylate being about 50 to 90% by weight of the methacrylate-diolefin-styrene graft copolymer obtained.

6. As an article of manufacture, a linoleum carrying on the wear surface thereof a coating comprising a graft copolymer of a monomeric mixture of methyl methacrylate and styrene in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the monomeric mixture being about 50 to 90% by weight of the methacrylate-butadiene-styrene graft copolymer obtained.

7. As an article of manufacture, a linoleum carrying on the wear surface thereof a coating comprising a graft copolymer of a monomeric mixture of methyl methacrylate and vinyltoluene in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the monomeric mixture being about 50 to 90% by weight of the methacrylate-butadiene-styrene graft copolymer obtained.

8. As an article of manufacture, a felt-base type of floor-covering material having a decorative coating over which there is imposed as the wear surface of the floor-covering material a coating comprising a graft copolymer of a mixture of methyl methacrylate and isobornyl methacrylate in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the mixture of methacrylates being about 50 to 90% by weight of the methacrylate-butadiene-styrene graft copolymer obtained.

9. As an article of manufacture, a felt-base type of floor-covering material having a decorative coating over which there is imposed as the wear surface of the floor-covering material a coating comprising a graft copolymer of methyl methacrylate obtained by polymerizing methyl methacrylate in an aqueous dispersion of a polymer of 50 to 100% by weight of a conjugated diolefin with up to 50% by weight of a member selected from the group consisting of styrene and vinyltoluene, the proportion of methacrylate being about 50 to 90% by weight of the methacrylate-diolefin-styrene graft copolymer obtained.

10. As an article of manufacture, a felt-base type of flooring-covering material having a decorative coating over which there is imposed as the wear surface of the floor-covering material a coating comprising a graft copolymer of a monomeric mixture of methyl methacrylate and styrene in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the monomeric mixture being about 50 to 90% by weight of the methacrylate-butadiene-styrene graft copolymer obtained.

11. As an article of manufacture, a felt-base type of floor-covering material having a decorative coating over which there is imposed as the wear surface of the floor-covering material a coating comprising a graft copolymer of a monomeric mixture of methyl methacrylate and vinyltoluene in which the proportion of the latter is up to 150% by weight of the former obtained by polymerizing the monomeric mixture in an aqueous dispersion of a polymer of 50 to 100% by weight of butadiene with up to 50% by weight of styrene, the proportion of the monomeric mixture being about 50 to 90% by weight of the methacrylate-butadiene-styrene graft copolymer obtained.

References Cited in the file of this patent

UNITED STATES PATENTS

| | | |
|---|---|---|
| 2,707,157 | Stanton et al. | Apr. 26, 1955 |
| 2,742,377 | Bezman | Apr. 17, 1956 |
| 2,843,561 | Ingley et al. | July 15, 1958 |
| 2,857,360 | Feuer | Oct. 21, 1958 |